(12) United States Patent
Vincent et al.

(10) Patent No.: US 7,844,800 B2
(45) Date of Patent: Nov. 30, 2010

(54) METHOD FOR RENAMING A LARGE NUMBER OF REGISTERS IN A DATA PROCESSING SYSTEM USING A BACKGROUND CHANNEL

(75) Inventors: Melanie Emanuelle Lucie Vincent, Grasse (FR); Florent Begon, Antibes (FR); Cedric Denis Robert Airaud, Saint Laurent du Var (FR); Norbert Bernard Eugene Lataille, Le Cannet (FR)

(73) Assignee: ARM Limited, Cambridge (GB)

( * ) Notice: Subject to any disclaimer, the term of this patent is extended or adjusted under 35 U.S.C. 154(b) by 444 days.

(21) Appl. No.: 11/892,295

(22) Filed: Aug. 21, 2007

(65) Prior Publication Data
US 2008/0082792 A1    Apr. 3, 2008

(30) Foreign Application Priority Data
Oct. 3, 2006    (GB) .................................. 0619522.6

(51) Int. Cl.
*G06F 9/30*    (2006.01)
*G06F 9/40*    (2006.01)

(52) U.S. Cl. .................. 712/217; 712/218; 712/210
(58) Field of Classification Search .............. 712/217, 712/218
See application file for complete search history.

(56) References Cited

U.S. PATENT DOCUMENTS

| | | | |
|---|---|---|---|
| 6,049,839 A | 4/2000 | Fujii et al. | |
| 2005/0091475 A1* | 4/2005 | Sodani | ................. 712/217 |

OTHER PUBLICATIONS

ARM Ltd, ARM® Instruction Set Quick Reference Card, Oct. 2003.*
GB Search Report for GB0619522.6 dated Jan. 4, 2007.

* cited by examiner

*Primary Examiner*—Alford W Kindred
*Assistant Examiner*—Jesse R Moll
(74) *Attorney, Agent, or Firm*—Nixon & Vanderhye P.C.

(57) ABSTRACT

A processor 2 utilising register renaming executes program instructions requiring a large number of architectural register specifiers to be renamed by dividing the renaming tasks into an initial set and a remaining set. The initial set are performed first and the results passed via a main channel 32 for further processing. The remaining set are performed in sequence with the results being passed via a background channel 34 for further processing. This technique is particularly useful for performing renaming operations for load/store multiple LDM instructions.

24 Claims, 3 Drawing Sheets

METHOD FOR RENAMING A LARGE NUMBER OF REGISTERS IN A DATA PROCESSING SYSTEM USING A BACKGROUND CHANNEL

BACKGROUND OF THE INVENTION

1. Field of the Invention

This invention relates to data processing systems. More particularly, this invention relates to data processing systems using register renaming whereby register specifiers of an architectural set of registers are mapped to register specifiers of a physical set of registers.

2. Description of the Prior Art

Register renaming is a known technique for assisting in the support of out-of-order processing. Such systems are typically aimed at high performance applications where reducing gate count and reducing power consumption are not predominant considerations.

A problem arises with register renaming techniques when handling program instructions which reference a large number of registers each requiring renaming. The mechanisms necessary to support renaming of a large number of registers at one time require a disadvantageously large gate count and an associated disadvantageously large power consumption. Furthermore, once the renaming mechanism has renamed the registers then all of these renamed register specifiers must be passed in parallel along an instruction pipeline to the units which will utilise them. The passing of such a large number of renamed register specifiers in parallel along the instruction pipeline also requires a disadvantageous gate count and area penalty with an associated disadvantageous increase in the power consumption. Whilst the above problems may not be significant in systems in which gate count, area and power consumption are not particular constraints, they do represent a significant problem in the context of small, inexpensive and power efficient processors in which it is desired to keep the gate count, area and power consumption low.

An alternative to the above would be to stall an instruction requiring a large number of register renaming operations so that these could be accomplished over several processing cycles. However, this would disadvantageously stall the following program instructions and would still require the renamed register specifiers to be passed in parallel across a disadvantageously broad path along the pipeline once they have been generated.

SUMMARY OF THE INVENTION

Viewed from one aspect the present invention provides apparatus for processing data, said apparatus comprising:

a physical set of registers;

register renaming circuitry responsive to register specifiers of an architectural set of register specifiers to map said register specifiers to registers of said physical set of registers, said architectural set of register specifiers representing registers as specified by instructions within an instruction set and said physical set of registers being physical registers for processing instructions of said instruction set; wherein said register renaming circuitry being responsive to a program instruction specifying an operation requiring more than a predetermined number of registers mappings:

(i) to divide said predetermined number of register mappings into an initial set of register mappings and a remaining set of register mappings;

(ii) to perform said initial set of register mappings to generate register specifiers for physical registers to be output on a main channel for further processing; and (iii) subsequent to performing said initial set of register mappings, to perform said remaining set of register mappings to generate register specifiers for physical registers to be output on a background channel separate from said main channel and concurrently with register specifiers for at least some other program instructions being generated by said register renaming circuitry and output on said main channel.

The present technique recognizes that in practice the physical register specifiers of an instruction requiring a large number of physical register specifiers will in practice not all be consumed at one time and accordingly need not necessarily be generated and passed together along the instruction pipeline in a single operation. The present technique exploits this realisation by providing both a main channel and a background channel from the register renaming circuitry for outputting the register specifiers for further processing. Thus, an initial set of register specifiers and register specifiers for following program instructions may be output from the register renaming logic for further processing down the main channel. This provides that the initial register specifiers required for further processing to start execution of the program instruction requiring a large number of register specifiers are available without delay down the normal main channel and that following program instructions can also provide their register specifiers down the normal main channel. The background channel provides a mechanism whereby the remaining set of register specifiers for the instruction requiring a large number of register specifiers may be passed for further processing concurrently with other register specifiers being sent along the main channel.

As an example, consider a load/store multiple instruction of the ARM instruction set. Such an instruction may specify that, for example, eight registers be loaded with data values read from memory. This load/store multiple instruction is executed by a load/store unit which in the context of the system employing register renaming needs to be supplied with the register specifiers for the renamed set of physical registers in order that it can load the data values to the appropriate physical registers. However, such a load/store unit will typically have a finite capacity for loading data values in parallel and this may well be less than the total number of register loads which are to take place. Thus, if the load/store unit can be passed the register specifiers needed to start the overall load/store operation down the main channel and then fed subsequent register specifiers via the background channel, then it may be kept properly employed in executing the load/store multiple instruction without stalling at the renaming stage to allow all the renaming operations to be performed in one go; requiring large numbers of register specifiers to be passed in parallel from the renaming stage; or preventing subsequent program instructions from being able to pass their renaming physical register specifiers via the main channel whilst the remaining register specifiers.

Whilst it might be possible for the background channel to pass all of the remaining set of register specifiers out for further processing in a single operation, it is more efficient and more flexible to provide that the background channel outputs the remaining set of register specifiers as a sequence.

In order to assist in this, the register renaming logic has a buffer memory for storing architectural register specifiers indicative of the remaining set of register mappings to be performed. This buffer memory can store the architectural register specifiers as an ordered list indicative of an ordering in which the remaining set of register mappings will be performed and outputted and this ordering may match the ordering which would be expected to be used by the circuits performing further processing using those register specifiers in a way which preserves consistency with an architectural model in which the register specifiers were generated and passed at a single time for further processing.

A constraint which can arise out of the present technique is that if an architectural register specifier is included within the remaining set of register mappings to be performed, then a subsequent program instruction which includes that architectural register specifier will not be subject to remapping until the preceding program instruction with its associated remaining set of architectural register specifiers has been processed to the extent that the architectural register specifier concerned has been subject to an appropriate remapping. This preserves in-order operation upstream of and including the renaming operation since it is the renaming operation, and typically the associated recovery mechanisms and joining mechanisms, which permit out-of-order operation to be tolerated.

Another constraint which can arise is that an instruction will not make use of a remaining set of mapping unless this is empty from mappings remaining to be performed from any preceding instruction.

It will be appreciated that the program instruction which has a number of register specifiers exceeding the predetermined number and requiring use of both the main channel and the background channel could take a wide variety of different forms. One particular example form for which the present technique may be used is load/store instructions executed by an associated load/store unit. In this context, the background channel can pass register specifiers for physical registers directly to the load/store unit. If the load/store unit is capable of consuming N register specifiers in any processor cycle, then this can be used to select the width of the background channel such that it can support passing up to N register specifiers in a processing cycle so as to keep the load/store unit fully occupied to the desired extent.

Viewed from another aspect the present invention provides a method of processing data, said method comprising the steps of:

mapping register specifiers of an architectural set of register specifiers to registers of a physical set of registers, said architectural set of register specifiers representing registers as specified by instructions within an instruction set and said physical set of registers being physical registers for processing instructions of said instruction set; wherein in response to a program instruction specifying an operation requiring more than a predetermined number of registers mappings, said step of mapping:

(i) divides said predetermined number of register mappings into an initial set of register mappings and a remaining set of register mappings;
(ii) performs said initial set of register mappings to generate register specifiers for physical registers to be output on a main channel for further processing; and
(iii) subsequent to performing said initial set of register mappings, performs said remaining set of register mappings to generate register specifiers for physical registers to be output on a background channel separate from said main channel and concurrently with register specifiers for at least some other program instructions being generated by said register renaming logic and output on said main channel.

Viewed from a further aspect the present invention provides apparatus for processing data, said apparatus comprising:

a physical set of register means;
register renaming means responsive to register specifiers of an architectural set of register specifiers for mapping said register specifiers to registers of said physical set of registers, said architectural set of register specifiers representing registers as specified by instructions within an instruction set and said physical set of registers being physical registers for processing instructions of said instruction set; wherein said register renaming means being responsive to a program instruction specifying an operation requiring more than a predetermined number of registers mappings:

(i) to divide said predetermined number of register mappings into an initial set of register mappings and a remaining set of register mappings;
(ii) to perform said initial set of register mappings to generate register specifiers for physical registers to be output on a main channel for further processing; and
(iii) subsequent to performing said initial set of register mappings, to perform said remaining set of register mappings to generate register specifiers for physical registers to be output on a background channel separate from said main channel and concurrently with register specifiers for at least some other program instructions being generated by said register renaming logic and output on said main channel.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
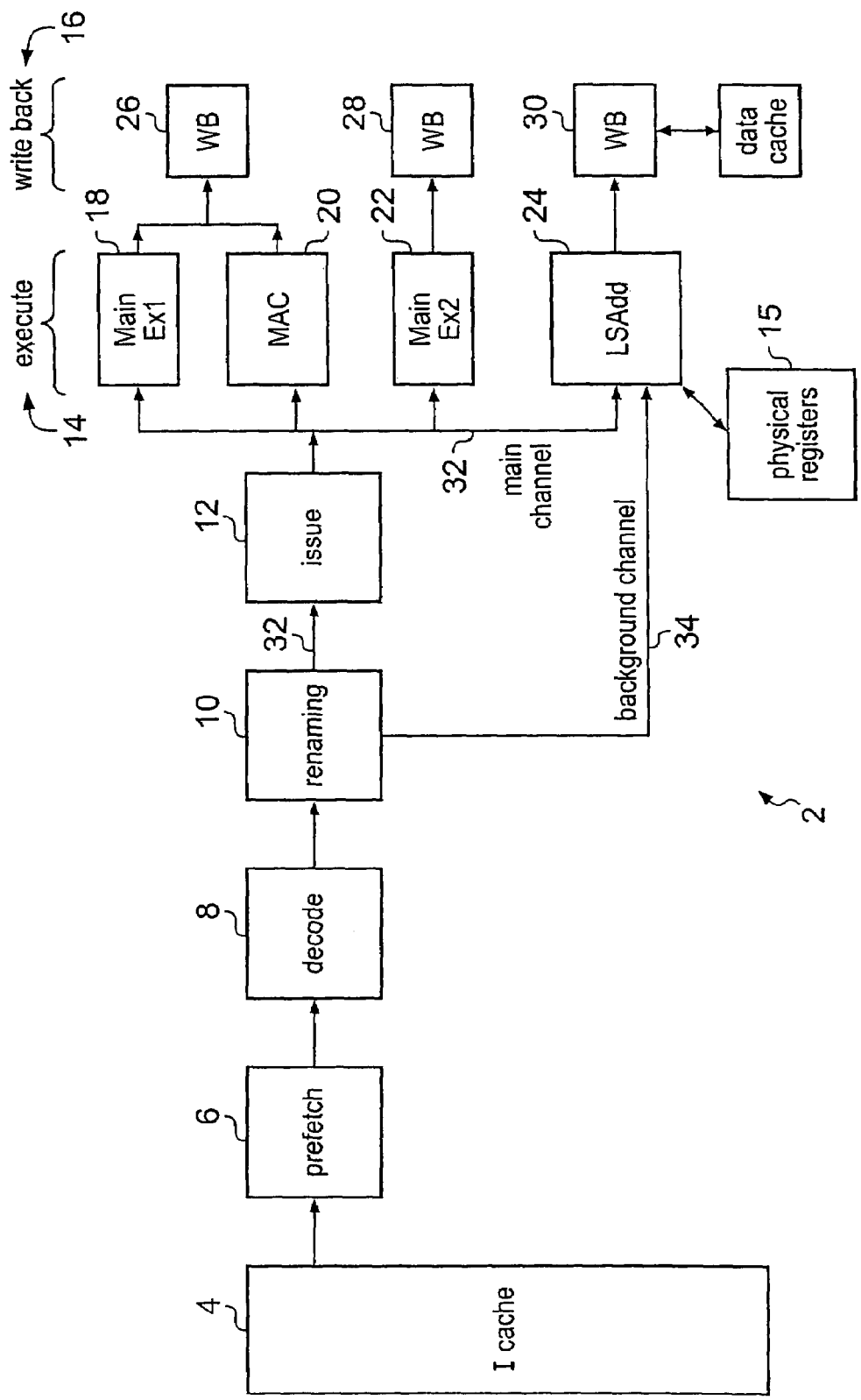
FIG. 1 schematically illustrates a data processing apparatus including an instruction pipeline having a register renaming stage and including both a main channel and a background channel for passing register specifiers.

FIG. 1 shows a data processing apparatus 2 including an instruction cache 4 supplying program instructions into an instruction pipeline which includes a prefetch stage 6, a decode stage 8, a renaming stage 10 an issue stage 12, an execute stage 14 (with associated physical registers 15) and a writeback stage 16. It will be appreciated that in practice additional and/or alternative pipeline stages may be included within such a data processing apparatus 2. Furthermore, it will be appreciated that a complete data processing apparatus 2 will typically include many additional elements which will be apparent to those skilled in this technical field and have been omitted from FIG. 1 for the sake of clarity.

The execute stage 14 includes multiple units which may process program instructions in parallel including a first main execution unit 18, a multiply accumulate unit 20, a second main execution unit 22 and a load/store address stage 24 (which acts to send requests to a load/store unit which is a state machine on the data side of the system). The first main execution unit 18 and the multiply accumulate unit 20 share a writeback unit 26. The second main execution unit 22 and the load/store address stage 24 each respectively have their own writeback unit 28, 30. As is normal with superscalar systems, multiple instructions can be issued in parallel from the issue stage 12 into various appropriate portions of the execute stage 14 for parallel execution. The renaming stage 10 permits the issue stage 12 to perform out-of-order instruction issue by virtue of the register renaming performed. Register renaming to facilitate out-of-order execution is in itself a known technique and will not be described further herein. The present technique is also useful with in-order instruction issue systems, e.g. to avoid pipelining all the register specifiers along the pipeline.

The renaming stage 10 of the present technique has both a main channel output 32 and a background channel output 34 for passing register specifiers, and other control signals, downstream in the instruction pipeline. The main channel 32 is used for most instructions which require relatively few register specifiers and accordingly has a width matched to such normal instructions, e.g. a width capable of passing register specifiers relating to three registers to be read and two registers to be written, although it will be appreciated that these sizes are purely an example and different widths may be used depending upon the application concerned. The background channel 34 has a width to support supplying two register specifiers to the load/store address stage 24 per processing cycle independently of any signals being passed along the main channel 32.

When a load/store instruction is encountered requiring a number of register specifiers exceeding the capability of the main channel (i.e. greater than a predetermined number), the register mappings to be performed are divided into an initial set and a remaining set. The initial set is performed first and the results passed from the renaming stage 10 to the issue stage 12 down the normal-main channel 32. The remaining set of remappings are performed on subsequent processing cycles as a background operation and the results are passed two at a time along the background channel 34 directly to the load/store address stage 24. Thus, once the initial set of mappings has been performed by the renaming stage 10 and passed along the main channel 32, then the main channel 32 and at least some of the renaming capability of the rename stage 10 is available for handling following program instructions without stalling these following program instructions. An exception exists in the case of a following program instruction specifying an architectural register which is included within the remaining set of remappings to be performed, as the remappings themselves are constrained to be performed in order. Such a following program instruction is halted.

Figure 2:
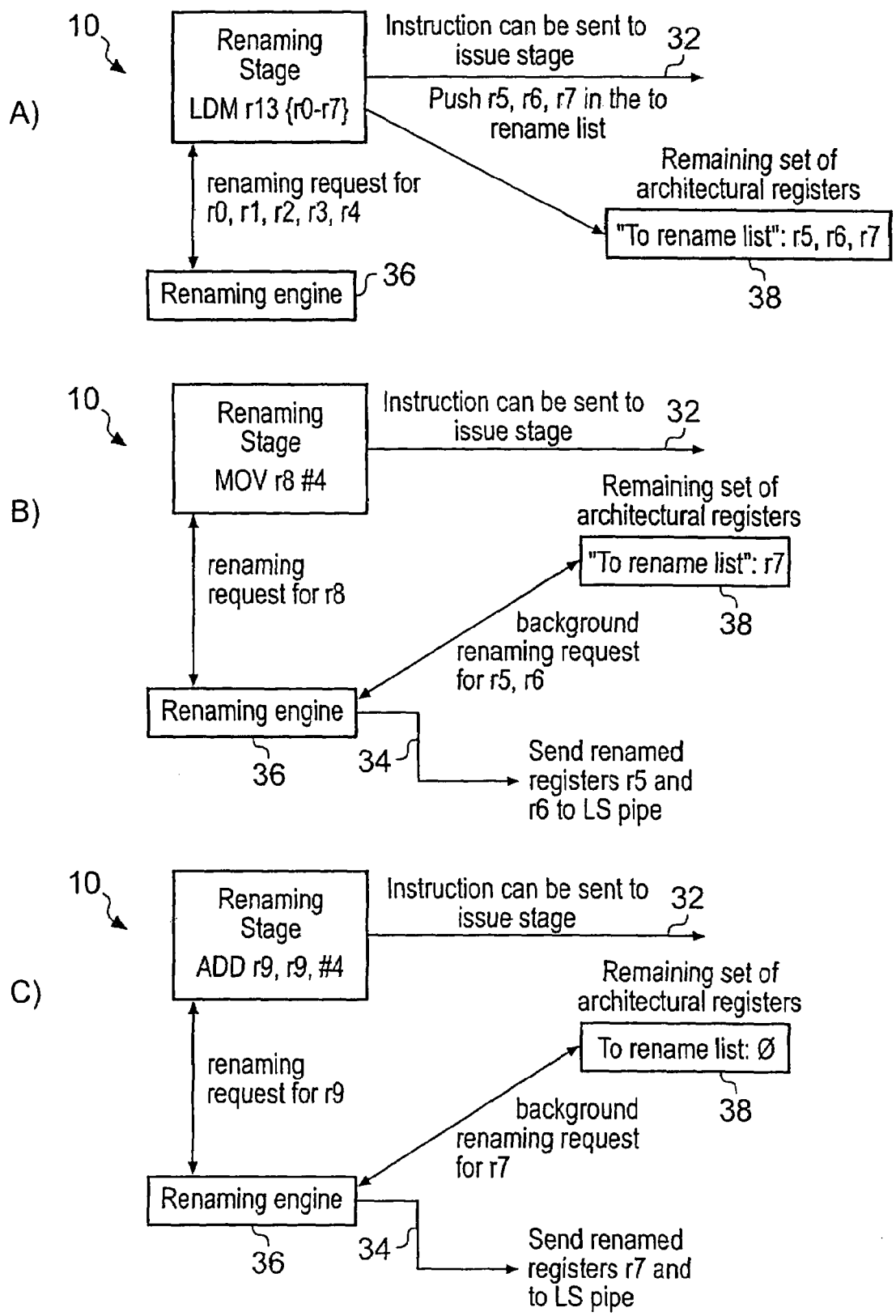
FIG. 2 schematically illustrates register renaming circuitry, which forms part of the system of FIG. 1, at various times in processing a load/store multiple instruction.

FIG. 2 illustrates the renaming stage 10 performing the mapping operations associated with a load multiple instruction and subsequent program instructions. In state A, a load multiple instruction LDM is received in the renaming stage 10 and specifies that a registers r0-r7 are to be loaded with data values in sequence read from memory starting at a memory address specified by the value held within register r13. The renaming stage 10 in this example has the capability to pass five register specifiers at a time to the issue stage 12 along the main channel 32, but this is insufficient to pass all of the eight remapped register specifiers which will be needed for the complete execution of the LDM instruction. The renaming engine 36 included within the renaming stage 10 has the capacity to form five register renaming operations in one processing cycle. Thus, in the state illustrated at point A, the renaming of registers r0-r4 is performed and these renamed register specifiers are passed together with the control signals associated with the LDM instruction out along the main channel 32 to the issue stage 12 and thence to the load/store address stage 24. A buffer memory 38 is provided into which specifiers for the remaining set of architectural registers r5-r7 which have not yet been renamed are stored in a "to rename list".

State B illustrates the following cycle in which a following instruction MOV specifies loading a register r8 with a specified data value. A renaming request for the register concerned, i.e. r8, is passed to the renaming engine 36 and the renamed register specifier returned is issued together with the control signals associated with the MOV instruction down along the main channel 32 to the issue stage 12. At the same time, the next two architectural registers in the "to rename list" representing the remaining set of architectural registers are sent to the renaming engine 36 for renaming. In this example the next two architectural registers in the ordered list stored within the buffer memory 8 are registers r5 and r6. These registers r5 and r6 are removed from the "to rename list", mapped by the renaming engine 36 and output on the background channel 34 directly to the load store address stage 24 along its load/store pipeline. State B leaves one architectural register r7 remaining in the buffer memory 38 for remapping.

State C illustrates the next processing cycle in which an ADD instruction is executed which adds a fixed value to the data value held in the register r9 and then stores this result back into the register r9. A renaming request relating to register r9 is sent to the renaming engine 36. The last architectural register r7 in the "to rename list" is also sent from the buffer memory 38 to the renaming engine 36 and is subject to renaming and then output on the background channel 34 to the load/store pipeline. This leaves the buffer memory 38 empty. The renamed register specifier for the ADD instruction relating to the register r9 is passed out along the main channel 32 at the same time together with the control signals associated with the ADD instruction.

Figure 3:
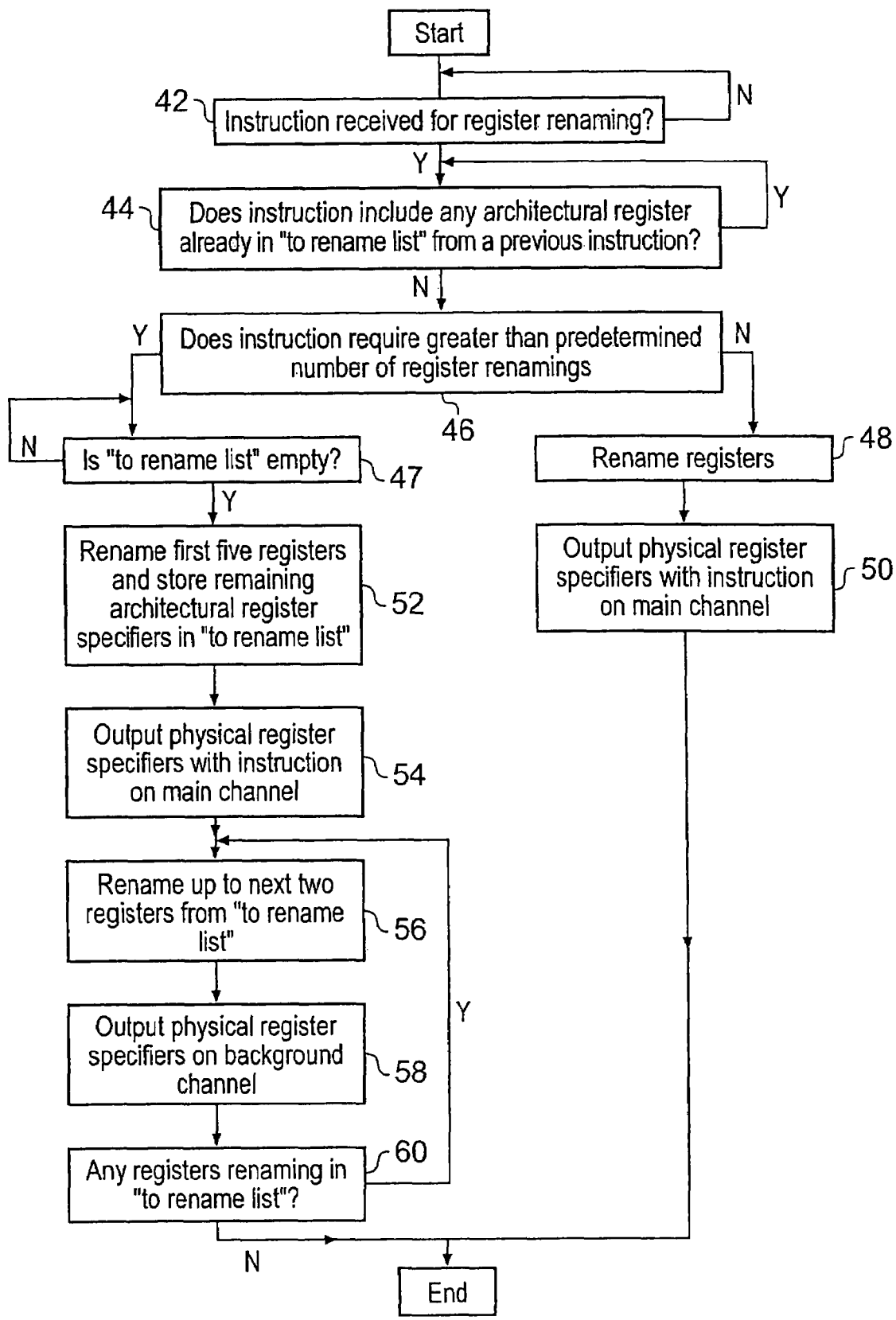
FIG. 3 is a flow diagram schematically illustrating the operation of the register renaming circuitry utilising both the main channel and the background channel for passing register specifiers.

FIG. 3 is a flow diagram illustrating the operation of the renaming stage 10. It will be appreciated that the flow diagram of FIG. 3 necessarily presents the operations as being performed sequentially in a manner which may not be reflected in the hardware operation. Nevertheless, the overall operation achieves the same result and it will be apparent to those in this technical field how various hardware implementations providing the operations illustrated in FIG. 3 can be provided.

At step 42, the renaming stage 10 waits to receive an instruction requiring renaming. Step 44 checks as to whether or not the instruction received includes a requirement to remap an architectural register which is already subject to a pending remapping operation by virtue of being stored in the "to rename list" of the buffer memory 38. If such a pending remapping is detected, then the renaming stage 10 waits to perform the new remapping until after this previous remapping has been completed.

At step 46, the renaming stage 10 determines whether or not the new program instruction requires greater than a predetermined number of register remappings to be performed. As an example, an LDM instruction which specified only a few registers to be loaded might be remapped and passed to the remainder of the pipeline without requiring use of the background channel 34. However a LDM instruction including a long list of registers would require use of the background channel 34.

If the predetermined number is not exceeded, then processing proceeds to step 48 where register renaming by the renaming engine 36 is performed and then step 50 where the physical register specifiers together with the instruction concerned are output along the main channel 32 to the issue stage 12.

If the predetermined number is exceeded, then processing proceeds to step 47 where a determination is made as to whether the "to rename list" is empty. If the "to rename list" is not empty then the instruction received at step 42 for renaming is stalled until the "to rename list" is empty so as not to mix architectural register specifiers from different instructions in the "to rename list". This stall condition is rare and in many cases leads to stalls for other reasons. At step 52 the first five registers which require renaming are subject to a renaming operation. The remaining architectural registers specifiers requiring renaming are stored into the "to rename list" of the buffer memory 38. At step 54, the physical register specifiers for the five registers which have been remapped are passed out on the main channel 32 together with the instruction concerned. (Steps 54 and 50 of FIG. 3 would normally have the same timing relative to receipt of the instruction requiring remapping.) After stage 54, on the next processing cycle up to the next two registers on the "to rename list" stored in the buffer memory 38 are renamed using the renaming engine 36. This is illustrated in stages B and C of FIG. 2. At step 58, the physical register specifiers for the renamed members of the remaining set of architectural register specifiers are output from the background channel 34 into the load/store pipeline to the load store address stage 24. Step 60 determines whether there are any registers remaining in the "to rename list" stored in the buffer memory 38, and, if there are, then returns processing to step 56.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
    a physical set of registers;
    register renaming circuitry, responsive to register specifiers of an architectural set of register specifiers, configured to map said register specifiers to registers of said physical set of registers, said architectural set of register specifiers representing registers as specified by instructions within an instruction set and said physical set of registers being physical registers for processing instructions of said instruction set; wherein
    said register renaming circuitry, responsive to a program instruction specifying an operation requiring more than a predetermined number of register mappings, configured:
    (i) to divide said more than a predetermined number of register mappings into an initial set of register mappings and a remaining set of register mappings;
    (ii) to perform said initial set of register mappings to generate register specifiers for physical registers output on a main channel for further processing; and
    (iii) subsequent to performing said initial set of register mappings, to perform said remaining set of register mappings to generate register specifiers for physical registers output on a background channel separate from said main channel and concurrently with register specifiers for at least some other program instructions being generated by said register renaming circuitry and output on said main channel.

2. Apparatus as claimed in claim 1, wherein said remaining set of register mappings are performed as a sequence of register mappings each generating register specifiers for physical registers to be output on said background channel and a reduced remaining set of register mappings.

3. Apparatus as claimed in claim 1, wherein said register renaming circuitry has a buffer memory for storing architectural register specifiers indicative of said remaining set of register mappings.

4. Apparatus as claimed in claim 3, wherein said buffer memory stores said architectural register specifiers as an ordered list indicative an order in which said remaining set of register mappings will be performed.

5. Apparatus as claimed in claim 1, wherein a program instruction having an architectural register specifier included within said remaining set of register mapping is not subject to register remapping until after said architectural register specifier has been removed from said remaining set of register mappings.

6. Apparatus as claimed in claim 1, wherein said program instruction specifying said operation requiring more than said predetermined number of register mappings is stalled if a second remaining set of register mappings remains from a preceding program instruction specifying an operation requiring more than said predetermined number of register mappings.

7. Apparatus as claimed in claim 1, comprising a load/store unit and wherein said program instruction is a load multiple instruction or a store multiple instruction performed by said load/store unit.

8. Apparatus as claimed in claim 7, wherein said background channel passed register specifiers for said physical registers directly to said load/store unit.

9. Apparatus as claimed in claim 7, wherein said load/store unit is able to perform load/store operations consuming values stored in N physical registers in a processing cycle and said background channel is arranged to pass to said load/store unit register specifiers for up to N physical register in a processing cycle.

10. Apparatus as claimed in claim 1, wherein said initial set of register mappings includes mappings of the first X registers of the registers required by the program instruction, where X is said predetermined number.

11. A method of processing data, said method comprising the steps of:
    mapping register specifiers of an architectural set of register specifiers to registers of a physical set of registers, said architectural set of register specifiers representing registers as specified by instructions within an instruction set and said physical set of registers being physical registers for processing instructions of said instruction set; wherein
    specifying, in response to a program instruction, an operation requiring more than a predetermined number of register mappings, said step of mapping:
    (i) dividing said more than a predetermined number of register mappings into an initial set of register mappings and a remaining set of register mappings;
    (ii) performing said initial set of register mappings to generate register specifiers for physical registers output on a main channel for further processing; and
    (iii) performing, subsequent to performing said initial set of register mappings, said remaining set of register mappings to generate register specifiers for physical registers output on a background channel separate from said main channel and concurrently with register specifiers for at least some other program instructions being generated by said register renaming logic and output on said main channel.

12. A method as claimed in claim 11, wherein said remaining set of register mappings are performed as a sequence of register mappings each generating register specifiers for physical registers to be output on said background channel and a reduced remaining set of register mappings.

13. A method as claimed in claim 11, comprising storing in a buffer memory architectural register specifiers indicative of said remaining set of register mappings.

14. A method as claimed in claim 13, wherein said buffer memory stores said architectural register specifiers as an ordered list indicative an order in which said remaining set of register mappings will be performed.

15. A method as claimed in claim 11, wherein a program instruction having an architectural register specifier included within said remaining set of register mapping is not subject to register remapping until after said architectural register specifier has been removed from said remaining set of register mappings.

16. A method as claimed in claim 11, wherein said program instruction specifying said operation requiring more than said predetermined number of register mappings is stalled if a second remaining set of register mappings remains from a preceding program instruction specifying an operation requiring more than said predetermined number of register mappings.

17. A method as claimed in claim 11, wherein said program instruction is a load multiple instruction or a store multiple instruction performed by a load/store unit.

18. A method as claimed in claim 17, wherein said background channel passed register specifiers for said physical registers directly to said load/store unit.

19. A method as claimed in claim 17, wherein said load/store unit is able to perform load/store operations consuming values stored in N physical registers in a processing cycle and said background channel is arranged to pass to said load/store unit register specifiers for up to N physical register in a processing cycle.

20. Apparatus for processing data, said apparatus comprising:
a physical set of register means;
register renaming means, responsive to register specifiers of an architectural set of register specifiers, for mapping said register specifiers to registers of said physical set of registers, said architectural set of register specifiers representing registers as specified by instructions within an instruction set and said physical set of registers being physical registers for processing instructions of said instruction set; wherein
said register renaming means, responsive to a program instruction specifying an operation requiring more than a predetermined number of register mappings, for:
(i) dividing said more than a predetermined number of register mappings into an initial set of register mappings and a remaining set of register mappings;
(ii) for performing said initial set of register mappings to generate register specifiers for physical registers output on a main channel for further processing; and
(iii) subsequent to performing said initial set of register mappings, for performing said remaining set of register mappings to generate register specifiers for physical registers output on a background channel separate from said main channel and concurrently with register specifiers for at least some other program instructions being generated by said register renaming logic and output on said main channel.

21. Apparatus for processing data, said apparatus comprising:
a physical set of registers;
register renaming circuitry responsive to register specifiers of an architectural set of register specifiers to map said register specifiers to registers of said physical set of registers, said architectural set of register specifiers representing registers as specified by instructions within an instruction set and said physical set of registers being physical registers for processing instructions of said instruction set; wherein
said register renaming circuitry being responsive to a program instruction specifying an operation requiring more than a predetermined number of register mappings:
(i) to divide said more than a predetermined number of register mappings into an initial set of register mappings and a remaining set of register mappings;
(ii) to perform said initial set of register mappings to generate register specifiers for physical registers to be output on a main channel for further processing; and
(iii) subsequent to performing said initial set of register mappings, to perform said remaining set of register mappings to generate register specifiers for physical registers to be output on a background channel separate from said main channel and concurrently with register specifiers for at least some other program instructions being generated by said register renaming circuitry and output on said main channel, wherein said program instruction specifying said operation requiring more than said predetermined number of register mappings is stalled if a second remaining set of register mappings remains from a preceding program instruction specifying an operation requiring more than said predetermined number of register mappings.

22. Apparatus as claimed in claim 21, comprising a load/store unit and wherein said program instruction is a load multiple instruction or a store multiple instruction performed by said load/store unit, wherein said background channel passed register specifiers for said physical registers directly to said load/store unit.

23. A method of processing data, said method comprising the steps of:
mapping register specifiers of an architectural set of register specifiers to registers of a physical set of registers, said architectural set of register specifiers representing registers as specified by instructions within an instruction set and said physical set of registers being physical registers for processing instructions of said instruction set; wherein
in response to a program instruction an operation requiring more than a predetermined number of register mappings, said step of mapping:
(i) divides said more than a predetermined number of register mappings into an initial set of register mappings and a remaining set of register mappings;
(ii) performs said initial set of register mappings to generate register specifiers for physical registers to be output on a main channel for further processing; and
(iii) subsequent to performing said initial set of register mappings, performs said remaining set of register mappings to generate register specifiers for physical registers to be output on a background channel separate from said main channel and concurrently with register specifiers for at least some other program instructions being generated by said register renaming logic and output on said main channel, wherein said program instruction specifying said operation requiring more than said predetermined number of register mappings is stalled if a second remaining set of register mappings remains from a preceding program instruction specifying an operation requiring more than said predetermined number of register mappings.

24. A method as claimed in claim 23, wherein said program instruction is a load multiple instruction or a store multiple instruction performed by a load/store unit, wherein said background channel passed register specifiers for said physical registers directly to said load/store unit.

* * * * *